(12) United States Patent
Maripudi et al.

(10) Patent No.: US 8,231,140 B2
(45) Date of Patent: Jul. 31, 2012

(54) AIRBAG MODULE WITH DEPLOYMENT CONTROL FLAP

(75) Inventors: Vivekananda Maripudi, Rochester Hills, MI (US); Jaime Fermin Perez, Lake Orion, MI (US); Benjamin Aguilar, Jalisco (MX); James Karlow, Commerce Township, MI (US); Nicole Wiggins, Southfield, MI (US); John Pilchowski, Highland, MI (US); William B. Cox, Berkley, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/018,320

(22) Filed: Jan. 31, 2011

(65) Prior Publication Data

US 2011/0121548 A1    May 26, 2011

Related U.S. Application Data

(62) Division of application No. 12/073,361, filed on Mar. 4, 2008, now Pat. No. 7,878,539.

(60) Provisional application No. 60/904,788, filed on Mar. 5, 2007, provisional application No. 60/924,927, filed on Jun. 5, 2007, provisional application No. 61/064,041, filed on Feb. 12, 2008.

(51) Int. Cl.
*B60R 21/2334* (2011.01)

(52) U.S. Cl. ................................. 280/740; 280/743.2

(58) Field of Classification Search .................. 280/740, 280/742, 743.1, 743.2
See application file for complete search history.

(56) References Cited

U.S. PATENT DOCUMENTS

| | | | | |
|---|---|---|---|---|
| 5,765,867 A * | 6/1998 | French | ......................... | 280/743.2 |
| 6,883,831 B2 * | 4/2005 | Hawthorn et al. | ............ | 280/739 |
| 6,942,242 B2 * | 9/2005 | Hawthorn et al. | ......... | 280/728.2 |
| 7,325,830 B2 * | 2/2008 | Higuchi et al. | ............... | 280/738 |
| 7,658,408 B2 * | 2/2010 | Zofchak et al. | ............ | 280/743.2 |
| 7,712,781 B2 * | 5/2010 | Klinkenberger et al. | .. | 280/743.1 |
| 7,878,539 B2 * | 2/2011 | Maripudi et al. | ............. | 280/740 |
| 2005/0212275 A1 * | 9/2005 | Hasebe | ........................ | 280/743.1 |
| 2007/0007757 A1 * | 1/2007 | Bauer et al. | ................ | 280/743.2 |

* cited by examiner

*Primary Examiner* — Joseph Rocca
(74) *Attorney, Agent, or Firm* — Foley & Lardner LLP (57) ABSTRACT

An airbag module includes a bag wrap, a retainer, an airbag, and an inflator to inflate the airbag. The airbag includes at least one vent hole, and a deployment control flap to change trajectory of the airbag such that the airbag will deploy upwards and laterally to left and right sides. The deployment control flap is fixed at both ends to the retainer, airbag, or bag wrap.

11 Claims, 8 Drawing Sheets

AIRBAG MODULE WITH DEPLOYMENT CONTROL FLAP

CROSS-REFERENCE TO RELATED PATENT APPLICATIONS

This application is a divisional of application Ser. No. 12/073,361, filed Mar. 4, 2008, now pending and claims priority to U.S. Provisional Application Nos. 60/904,788, filed Mar. 5, 2007; 60/924,927, filed Jun. 5, 2007; and 61/064,041 filed Feb. 12, 2008, all of which are incorporated herein by reference.

BACKGROUND

The present invention relates generally to the field of vehicle airbags. More specifically, the present invention relates to a vehicle mid-mount passenger airbag with simplified construction and improved performance.

Vehicle airbags are used to protect vehicle occupants from injury in the event of a vehicle crash. Current airbag designs incorporate a variety of components that enhance the performance of the airbag: number and configuration of cushion folding techniques; deployment control panels and delayer patch designs, or tethers; venting positions; and tear seams included for the passive venting of the airbag.

SUMMARY

One exemplary embodiment relates to an airbag module including a retainer, an airbag, and an inflator to inflate the airbag. The airbag includes at least one vent hole, and a deployment control flap to change trajectory of the airbag such that the airbag will deploy upwards and laterally to left and right sides. The deployment control flap is fixed at both ends to the retainer, airbag, or bag wrap.

Another embodiment relates to an airbag module including a retainer, an airbag, and an inflator to inflate the airbag. The airbag includes at least one vent hole that is exposed early during inflation of the airbag and remains unblocked throughout inflation of the airbag; and a deployment control flap attached at both ends to the retainer that is wrapped around the outside of the airbag prior to deployment of the airbag.

Another embodiment relates to an airbag module including a retainer, an airbag, and an inflator to inflate the airbag. The airbag includes at least one vent hole and a bag wrap to change trajectory of the airbag such that the airbag will deploy upwards and laterally to left and right sides. The bag wrap includes a first portion and a second portion. The first portion includes a first end fixed to the retainer. The intersection of the first portion and second portion is attached to the airbag. The second portion is folded under and positioned between the first portion of the bag wrap and the airbag;

DETAILED DESCRIPTION

An airbag is provided in vehicles for the protection of occupants in the event of a vehicle crash. The airbag is configured to rapidly inflate in a space between the vehicle occupant and the vehicle dash, pillar, or other structure. Airbags are generally most effective when the occupant is restrained in the vehicle by a safety device such as a safety belt (e.g., an "in-position" situation). However, in some scenarios, an occupant may not be restrained and may be closer to the vehicle dash or other structure during the vehicle crash (e.g., an "out-of-position" situation). In other scenarios, the vehicle may be occupied by a child in a child safety seat.

The embodiments described below allow for a low risk deployment of the airbag in a mid-mount configuration and provides a relatively lower cost means of achieving the same performance in other configurations (e.g., a high-mount configuration). While the airbag mechanism is described below as a dash-mounted airbag, it should be understood by those skilled in the art that the inventive concepts may be applied to any suitable airbag and such airbags may be located in a variety of locations within the vehicle (e.g., a side curtain airbag, a seat-mounted side impact airbag, etc.).

The airbag includes an inflatable cushion and an inflator. The cushion is generally formed with at least two panels of a suitable material, such as nylon. The panels are coupled together with a sewn or woven seam to form at least one inflatable chamber. The cushion may be divided into two or more chambers. Passages or ports are generally between individual chambers such that the chambers are in fluid communication with each other. The cushion is folded and concealed under a trim panel or other covering (cover) in a storage position. The inflator, such as a conventional pyrotechnic inflator, supplies gas for inflation/deployment of the restraint cushion. During a vehicle crash or rollover event, the inflator is activated to supply pressurized gas to inflate the cushion. The inflation gas enters the cushion and drives the airbag cushion away from the storage position and into the deployed position. In the deployed position, the cushion is disposed between the occupant and a structural member of the vehicle such as the vehicle dash. The airbag may further include a bag wrap (e.g., cushion wrap) or other protective covering that surrounds the cushion in the storage position and as the cushion deploys.

If the vehicle seat is occupied by a child safety seat, the airbag cushion deployment is modified by a vent location and a deployment control flap (sometimes referred to as a "panel" or a "flap patch"). In the initial stage of deployment, the center of the deploying airbag cushion may be restricted by a deployment control flap, changing the trajectory of the cushion such that the cushion may deploy upwardly and laterally to the right and left sides rather than being directly projected at the center of a backrest of a child seat. The location of the vent holes can be determined by the fold(s) in the airbag. Vent holes are exposed early so should there be an obstruction, such as the forward edge of the backrest of a child seat in close proximity to the deploying airbag which restricts deployment, gas escapes from exposed vent holes. Thus, the pressure escape can reduce deployment forces on the child seat.

As the airbag cushion continues to deploy, the deployment control flap unfolds in the direction of the trajectory of the deploying cushion. The initially restricted center of the cushion follows the unfolding deployment control flap. As the deployment control flap unfolds and unfurls, the tear section, located proximate to the upper flap mounting, yields under the tension of the cushion on the flap. The yielding of the tear section then causes the restriction produced by the deployment control flap to be progressively removed, starting at the top and moving toward the bottom. If the deployment control flap comes in contact with the back of a high backed convertible child seat, the restriction on the main panel of the cushion at the bottom is largely maintained. As a result, the bag trajectory is modified in a more upward direction. In addition to the backed traditional child seat, the flap will actually roll out over the child seat and the airbag trajectory will be modified in such that the deploying cushion trajectory passes above the child seat.

The airbag, in an embodiment, can utilize one or more vent holes to vent inflation gases. The vent holes can be X-vents, circular vents, or any other type of vent holes. A vent hole can be positioned on a right and/or left side panel of the airbag. The vent hole(s) can be located adjacent the throat of the airbag such that the vent holes are exposed early in the deployment of the airbag cushion and remain unblocked through deployment of the airbag.

Reference will now be made to the FIGURES.

Figure 1:
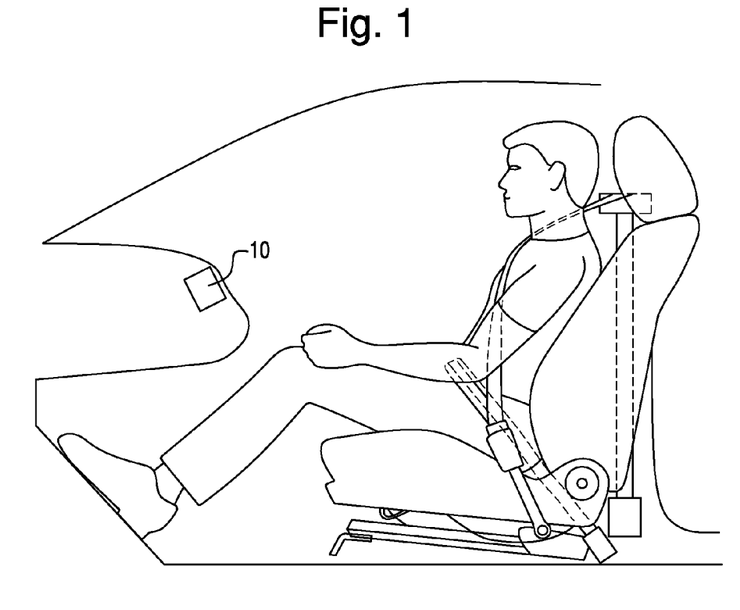
FIG. 1 is a side view of a vehicle including an airbag and an adult occupant according to an exemplary embodiment.
Figure 2:
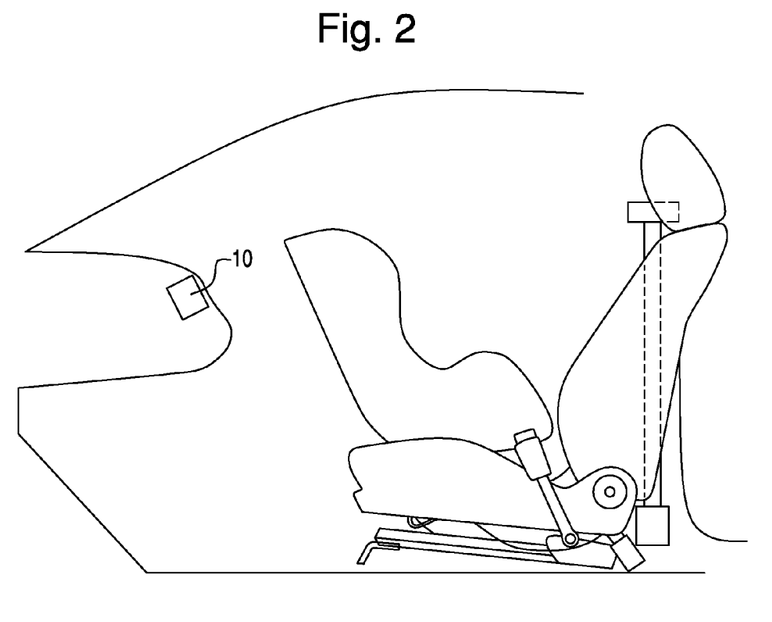
FIG. 2 is a side view of a vehicle including an airbag and a rear-facing child seat according to an exemplary embodiment.
Figure 10:
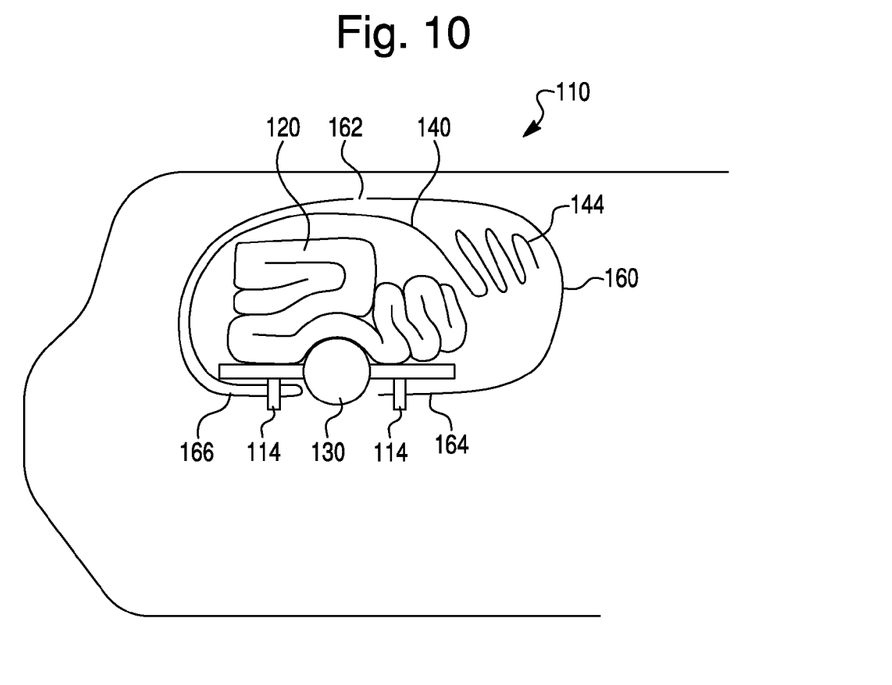
FIG. 10 is a side cross section view of an airbag module according to another exemplary embodiment in a folded or storage configuration provided in a top-mount position.
Figure 11:
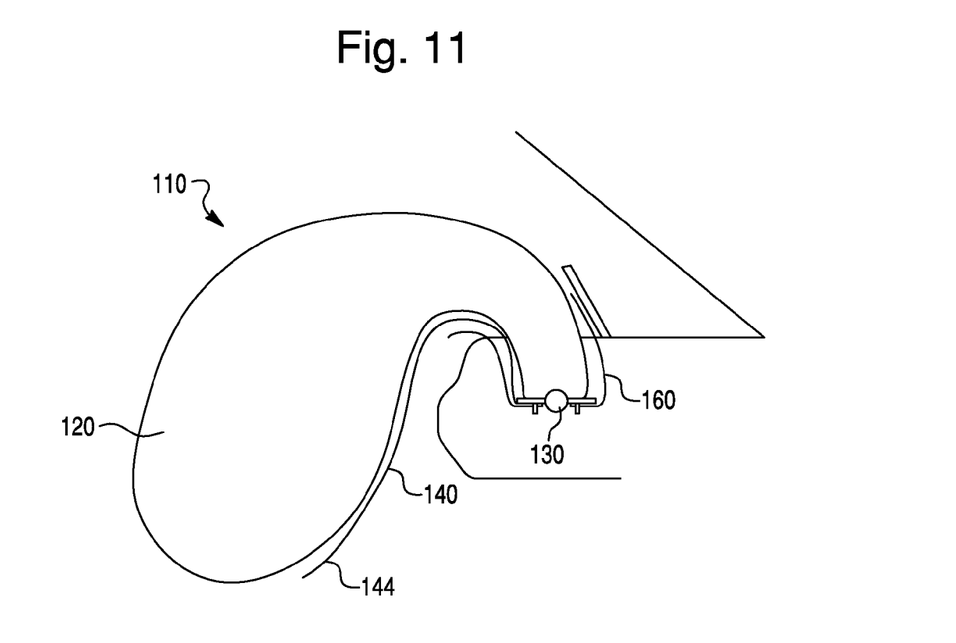
FIG. 11 is a side cross section view of the airbag module of FIG. 10 in a fully inflated configuration.

FIGS. 1 and 2 show a side view of a vehicle including an airbag module 10 according to an exemplary embodiment. Airbag module 10 can be used as a driver's side airbag, a passenger airbag, side airbag, etc. Airbag module 10 can be used in a plurality of vehicles, including cars, trucks, vans, SUVs, buses, RVs, etc. Airbag module 10 may be mounted, as shown in the FIGURES, in the vehicle dash with a retainer 12 (FIG. 4). According to various exemplary embodiments, airbag module 10 may be mid-mounted on the dash, as shown in FIGS. 1-5, or may be top-mounted on the dash, as shown in FIGS. 10-11, or the airbag module 10 may be mounted in any other suitable located in the vehicle. Airbag module 10 is provided to protect an occupant 5 of the vehicle in a collision.

Figure 3:
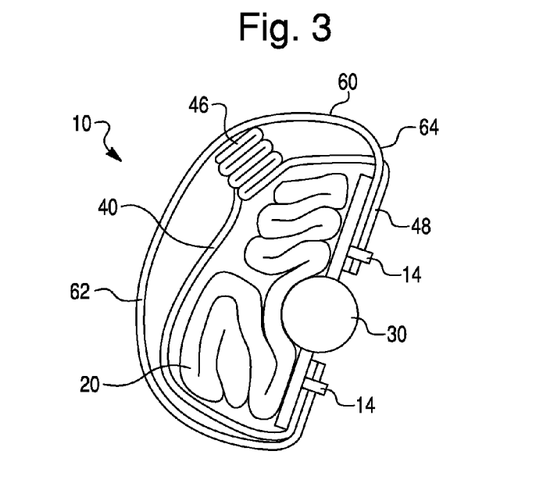
FIG. 3 is a side cross section view of an airbag module according to an exemplary embodiment in a folded or storage configuration provided in a mid-mount position.
Figure 4:
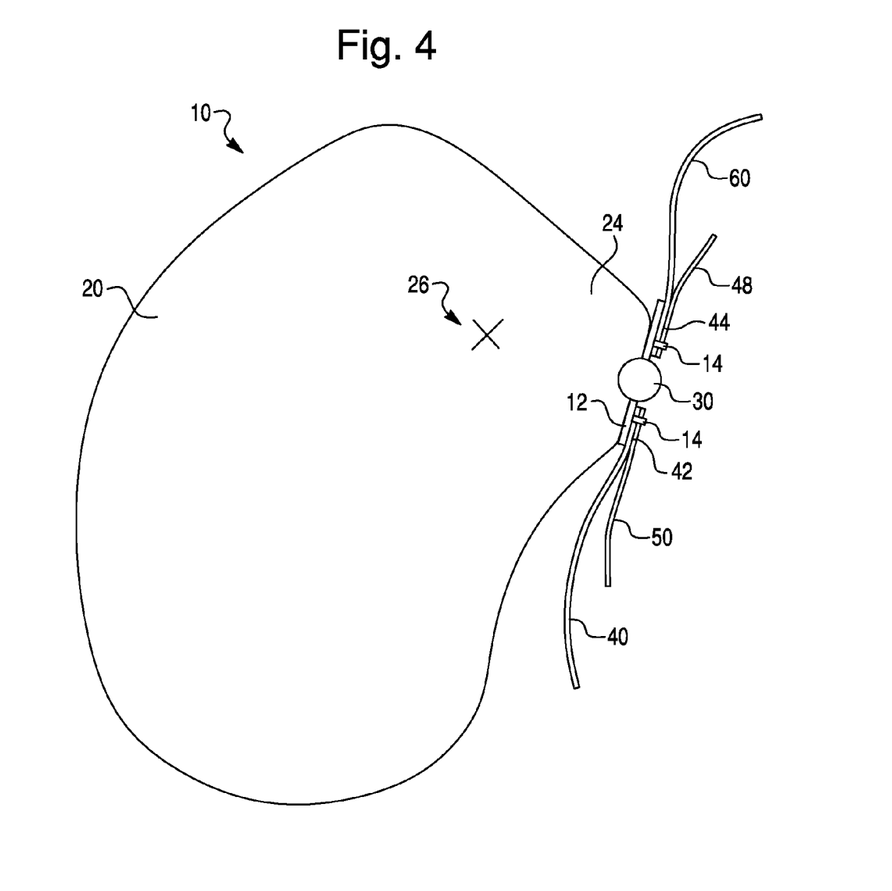
FIG. 4 is a side cross section view of the airbag module of FIG. 3 in a fully inflated configuration.

FIG. 3 illustrates an airbag module 10 according to an embodiment. Airbag module 10 includes an inflatable cushion 20, an inflator 30 to inflate cushion 20, a deployment control flap 40 to direct the deployment of cushion 20, and a bag wrap 60 that surrounds and retains cushion 20 when the cushion 20 is in a storage configuration.

Cushion 20 is formed from a multitude of fabric panels, folded and concealed under a trim panel or other covering in a storage position. According to one exemplary embodiment, cushion 20 is formed from at least a center panel and two side panels. Alternatively, cushion 20 can be a one-piece-woven airbag. Cushion 20 includes an opening or mouth that is coupled to a stationary object such as a mounting bracket and allows inflating gas from inflator 30 to enter cushion 20. Cushion 20 further includes a throat portion 24 that is provided proximate to mouth and may include one or more vents 26, such as shown in FIG. 4.

Inflator 30, such as a conventional pyrotechnic inflator, supplies gas for inflation/deployment of restraint cushion 20. During a vehicle crash or rollover event, inflator 30 is activated to supply pressurized gas to inflate cushion 20. The inflation gas enters the cushion 20 and drives cushion 20 away from the storage position (FIG. 3) and into the deployed position (FIG. 4). In the deployed position, the cushion 20 is disposed between the occupant 5 and a structural member of the vehicle such as the vehicle dash. A diffuser may be attached to the top and bottom of the throat 24 of cushion 20 and cause the gas produced by inflator 30 to be directed laterally to the side panels of cushion 20. The airbag cushion 20 may further include a bag wrap 60 (e.g., cushion wrap) or other protective covering that surrounds cushion 20 in the storage position and as the airbag cushion 20 deploys.

Figure 5:
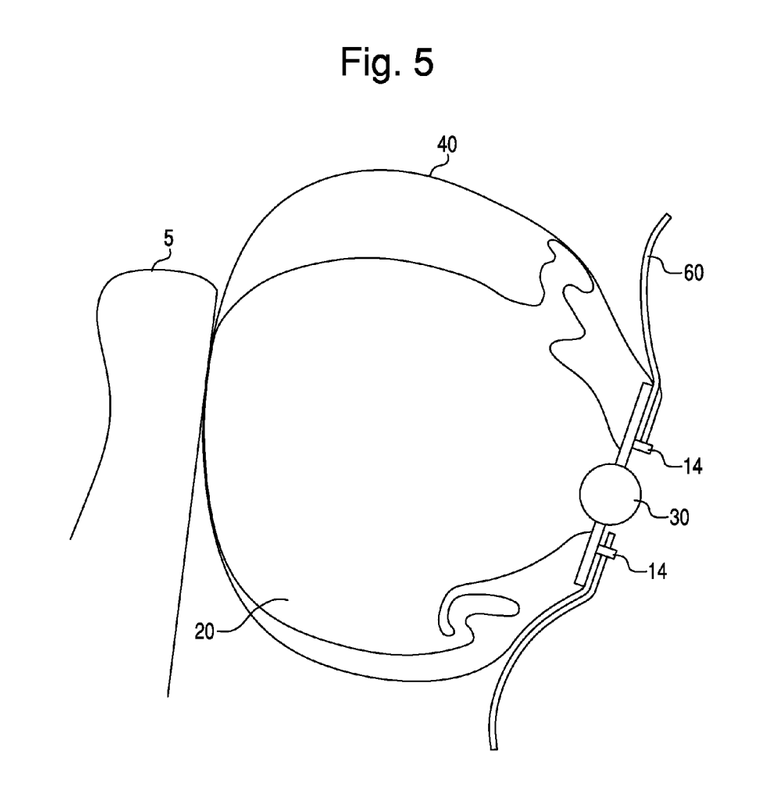
FIG. 5 is a side cross section view of an airbag module according to an exemplary embodiment in a partially inflated configuration after contacting an obstruction such as a rear-facing child seat.

One end of deployment control flap 40 is coupled to airbag module 10 and redirects inflating cushion 20 in certain deployment scenarios. Deployment control flap 40 restricts, in the initial stage of deployment, the center of the deploying cushion 20, changing the trajectory of cushion 20 such that the cushion 20 may deploy upwardly and/or laterally to the right and left sides. As shown in FIG. 5, if the inflating cushion 20 contacts an out-of-position occupant 5 (e.g., an occupant not wearing a seat belt or otherwise located too close to the inflating cushion, or a rear-facing child seat), deployment control flap 40 redirects the direction of inflation of cushion 20 so the cushion 20 is directed up and/or to the side rather than directly at the center of a backrest of a child seat or out-of-position occupant.

Figure 6:
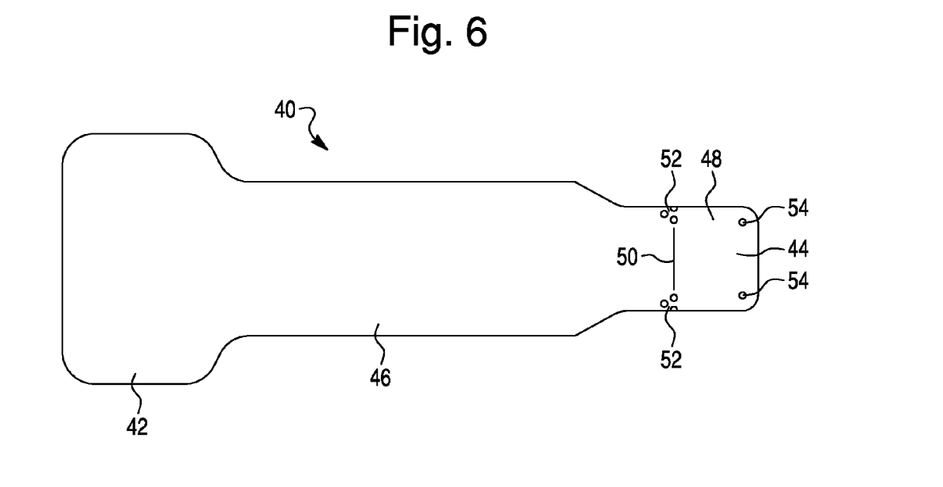
FIG. 6 is a top view of a deployment control flap for the airbag module of FIG. 3 according to one exemplary embodiment.

Referring to FIG. 6, deployment control flap 40 is shown according to one exemplary embodiment. Deployment control flap 40 is an elongated fabric panel that may be formed from the same material as airbag cushion 20 (e.g., nylon) or any other suitable material. In one exemplary embodiment, a first end 42 of deployment control flap 40 is coupled to retainer studs 14 that are provided to couple airbag module 10 to the vehicle. According to other exemplary embodiments, deployment control flap 40 may be fixedly attached to the mouth of cushion 20 such as being sewn to throat 24 of cushion 20. One or both ends 42, 44 may be attached/fixed to the retainer 12, retainer studs 14, cushion 20, or other component of the airbag module 10.

In one particular embodiment, deployment control flap 40 extends from the bottom of cushion 20, when cushion 20 is mounted to a vehicle dash in a mid-mount position. The length of deployment control flap 40 may be dependant upon the internal size of the vehicle and the mounting position of the airbag cushion 20. The opposite end 44 of deployment control flap 40 is coupled to an upper cushion retainer mounting at the top of cushion 20. Deployment control flap 40 includes a folded section 46 and a separation or tear section 48 proximate to second end 44 as shown in FIGS. 6 and 7A-7D. Tear section 48 includes a tear-away mechanism shown as a slit or cut 50 and one or more weakening features 52 such as holes formed in deployment control flap 40. Slit 50 and features 52 provide a weakened portion that allows tear section 48 to rupture when inflating cushion 20 presses against deployment control flap 40. The pressure needed to rupture tear section 48 and, therefore, the amount of time deployment control flap 40 restrains an inflating cushion 20 may be modified by changing the size, number, and/or spacing of features 52 and/or slit 50.

Figure 7A:
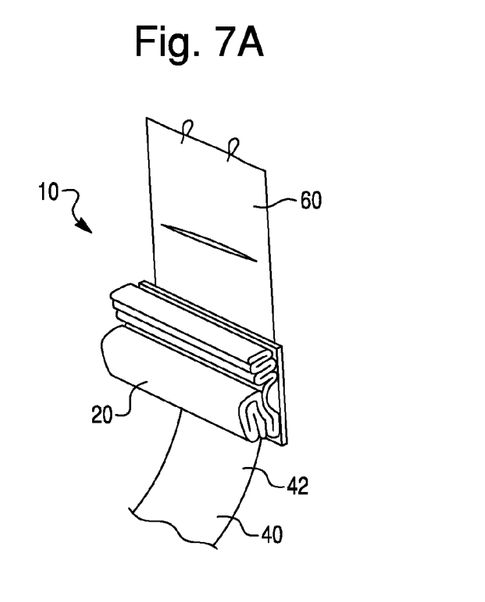
FIGS. 7A-7D are isometric views showing the deployment control flap of FIG. 6 being folded according to an exemplary embodiment.
Figure 7B:
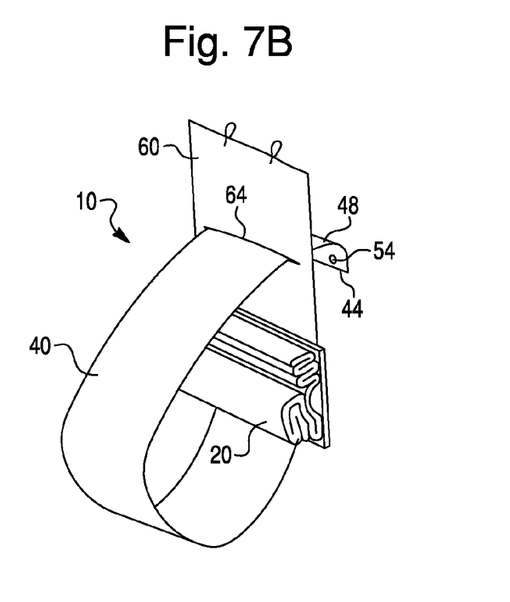
Figure 7C:
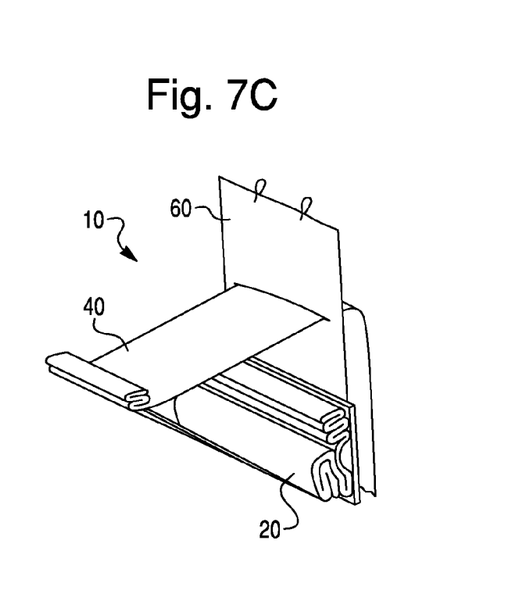
Figure 7D:
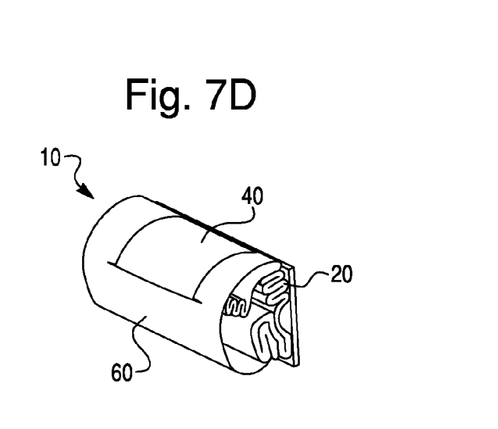

Referring now to FIGS. 7A-7D, one exemplary operation is shown for coupling a deployment control flap 40 to an airbag module 10 and of the folding of the deployment control flap 40. As shown in FIG. 7A, a first end 42 of deployment control flap 40 is coupled to airbag module 10. As shown in FIG. 7B, second end 44 is brought around folded cushion 20, passed through a slot 64 in bag wrap 60, and coupled to airbag module 10. According to an exemplary embodiment, second end 44 includes holes 54 that are spaced apart to receive upper retainer studs 14. When second end 44 is attached to airbag module 10, tear section 48 is generally aligned with the top of folded cushion 20. According to other exemplary embodiments, tear section 48 may be positioned proximate to first end 42, second end 44, a central portion, or any other suitable location or locations along the length of deployment control flap 40. Referring now to FIG. 7C, deployment control flap 40 is pulled away from cushion 20 to eliminate slack and the excess length is folded until the folded flap 40 lies against folded cushion 20. According to an exemplary embodiment, an accordion fold is used so that deployment control flap 40 may deploy quickly and smoothly. However, according to other exemplary embodiments, deployment control flap 40 may be otherwise folded. The folded deployment control flap 40 is stored proximate to the top of folded cushion 20. As shown in FIG. 7D, bag wrap 60 is pulled around folded deployment control flap 40 and folded cushion 20 and fastened in place (e.g., by hooking to retainer studs 14).

Folding deployment control flap 40 in the manner shown in the FIGS. 7A-7D determines the final position of vents 26 and the vent area exposed. The vent location is moved closer to the throat 24 of airbag cushion 20 at a location where the vents 26 are exposed early on in the deployment process. If the deploying cushion 20 contacts an object (e.g., an out of position occupant, a rear-facing child seat, etc.), as shown in FIG. 5, deployment control flap 40 directs the force of and inflation direction of cushion 20 upward and/or laterally. Because vents 26 are exposed early, inflating gasses can escape cushion 20, reducing the impact force on the occupant 5. The vents 26, in an embodiment, remain unblocked and exposed throughout inflation of the airbag cushion 20.

Airbag assembly 10 is enclosed in a bag wrap 60 used to contain the folds of various components of airbag module 10. A tear area 62 (FIG. 3) is located on bag wrap 60 to provide a weak point, so that during the deployment of cushion 20, bag wrap 60 tears with minimum resistance. A first end 64 of bag wrap 60 is attached to the airbag cushion 20 and a second end 66 of bag wrap 60 is attached to retainer studs 14. Alternatively, ends 64, 66 of the bag wrap 60 may each or both be attached to the retainer 12, retainer studs 14, airbag cushion 20, or any other suitable part of the airbag module 10.

Figure 8:
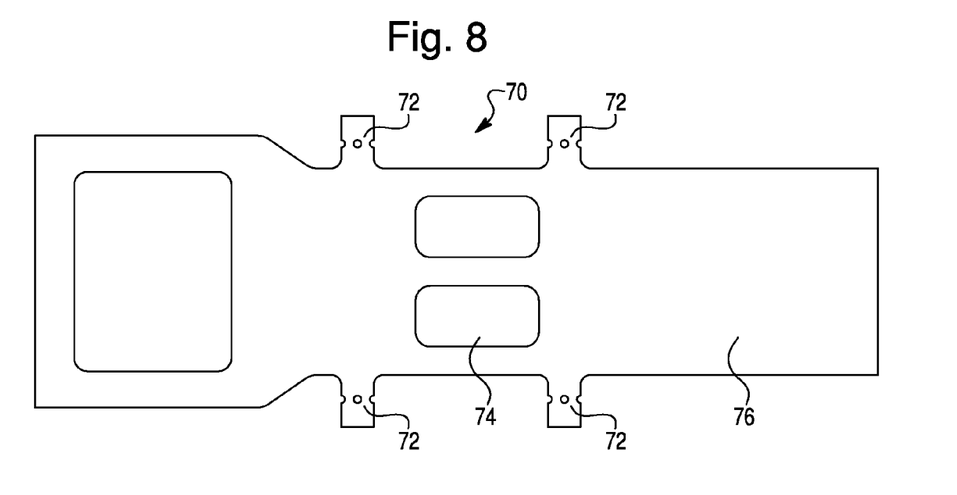
FIG. 8 is a top view of a portion of an airbag showing a passive venting system according to an exemplary embodiment.

FIG. 8 illustrates an embodiment with an internal guide panel 70 including on or more tear seams for passive venting of gasses from the interior of cushion 20. Passive venting allows airbag cushion vents 26 to remain open during initial inflation and to close when airbag cushion 20 is in its fully deployed state without the use of complicated or costly controls. According to one exemplary embodiment, internal panel 70 includes a first or open portion 74 and a second or closed portion 76. Internal panel 70 is attached to cushion 20 with tear tabs 72 (e.g., tear seams, etc.). During deployment, open portion 74 is aligned with openings or vents in cushion 20. As cushion 20 fully deploys, tear tabs 72 rupture and internal guide panel 70 is pulled such that closed portion 76 is aligned with the openings in cushion 20. The use of tear tabs 72 reduces the variability of break out tension needed to break stitches on demand. Tear tabs 72 can tear along a notched portion or in any other location when the airbag cushion 20 reaches a predetermined deployment phase. The pull of cushion 20 on internal panel 70 during deployment rips or tears tabs 72.

For instance, upon deployment, if airbag cushion 20 contacts an out-of-position occupant or some other object (e.g., a rear-facing child seat 5), airbag cushion 20 is not capable of full inflation. In this state, it is necessary to allow the inflation gases to escape to minimize possible injury to the vehicle occupants. Open portion 74 is aligned with vents (not shown) in the airbag cushion 20 and gasses are allowed to escape the interior of cushion 20 through vents. However, if airbag cushion 20 does not incur contact with an out of position occupant 5 or an object, the airbag is allowed to fully inflate and closed portion 76 is aligned with vents. Passive venting may be used in addition to deployment control flap 40.

Figure 9:
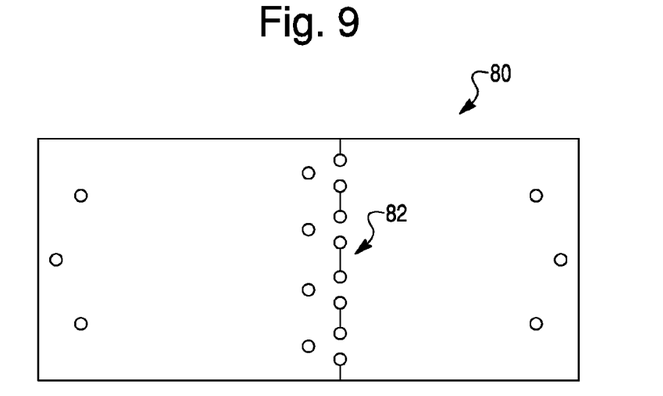
FIG. 9 is a top view of a delayer patch for an airbag module according to an exemplary embodiment.

FIG. 9 illustrates a delayer patch 80 for airbag cushion 20. The delayer patch 80 is located internally within the airbag cushion 20 or externally. Delayer patch 80 allows cushion 20 to deploy initially. According to the length of delayer patch 80, airbag cushion 20 will travel the distance required for the system or environment to restrict the initial effect of cushion 20, and therefore minimize injury to an occupant. Delayer patch 600 may utilize one or more tear seams 82, similar to those described above for internal panel 70. The tear seams 82 are configured to continue to tear away until airbag cushion 20 reaches the distance required. Ends of the delayer patch 80 may be attached to the retainer 12, retainer studs 14, airbag cushion 20, or any other suitable airbag module component.

Referring to FIG. 10, an airbag module 110 is shown according to another exemplary embodiment. Module 110 is similar to module 10 and includes an inflatable cushion 120, an inflator 130 to inflate cushion 120, a deployment control flap 140 to direct the inflation of cushion 120, and a bag wrap 160 that surrounds and retains cushion 120 when the cushion 120 is in a storage configuration. However, in this embodiment, deployment control flap 140 and bag wrap 160 are provided as one integrally formed body.

A tear area 162 is located on bag wrap 160 to provide a weak point, so that during the deployment of airbag assembly 110, bag wrap 160 tears with minimum resistance. Bag wrap 160 is coupled to the airbag module 110 (e.g., sewn to cushion 120, coupled to retainer studs, etc.) at a first end 164. Bag wrap 160 has a length that is extended to second end 166 and folded to form deployment control flap 140. Second end 166 is attached to the other end of the airbag module 110 (e.g., hooked to retainer studs 114, sewn to cushion 120, etc.). Deployment control flap 140 is contained between the folded cushion 120 and bag wrap 160. According to an exemplary embodiment, an end 144 of deployment control flap 140 is free and not attached to airbag module 110. Thus, the deployment control flap 140 is the portion of material of the bag wrap 160 from the folded over portion at second end 166 to the end 144.

The integration of the bag wrap 160 and deployment control flap 140, allows for the containment of the folded cushion 120 while eliminating one sew operation, i.e., the deployment control flap 140 being sewn to airbag cushion 120.

Referring to FIG. 11, the deployment of airbag assembly 110 is illustrated. As airbag cushion 120 inflates, bag wrap 160 releases at tear area 162, and bag wrap 160 and deployment control flap 140 unroll to allow airbag cushion 120 to further inflate.

Figure 12:
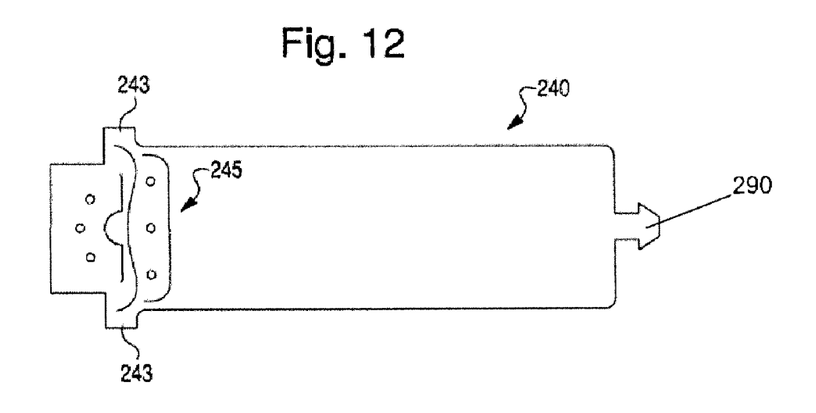
FIG. 12 is a top view of a deployment control flap according to another exemplary embodiment.
Figure 15:
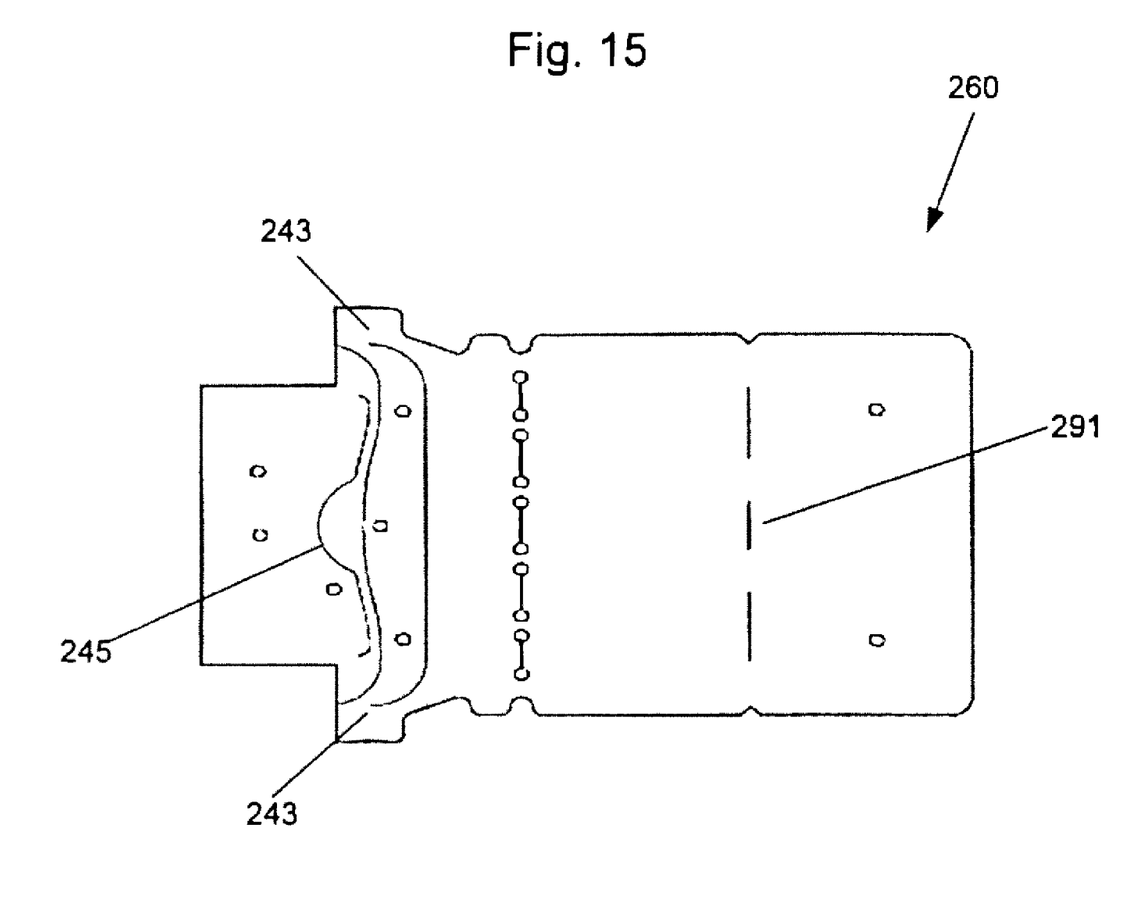
FIG. 15 is a top view of a bag wrap.

Referring to FIGS. 12 and 15, a deployment control flap 240 (FIG. 12) and a bag wrap 260 for an airbag assembly are shown according to another exemplary embodiment. Deployment control flap 240 incorporates tabs 243, slots 245 and tongue 290 configuration. The tongue 290 facilitates aligning deployment control flap 240 to bag wrap 260 (FIG. 15) where bag wrap 260 includes a slot 291 for the tongue 290. In-position timing and cushion trajectory are important to dynamic performance and low risk deployment schemes. Properly locating deployment control flap 240 helps to ensure proper in-position timing and cushion trajectory.

Figure 13:
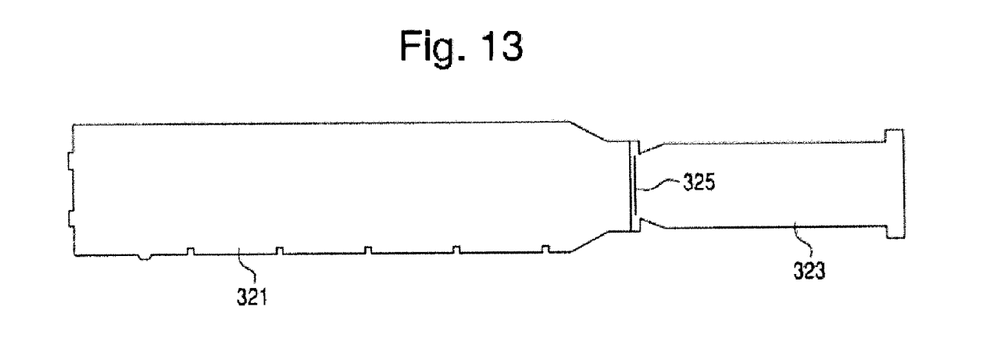
FIG. 13 is a top view of a extension flap for an airbag module according to an exemplary embodiment, shown as being coupled to the center panel of the airbag cushion.
Figure 14:
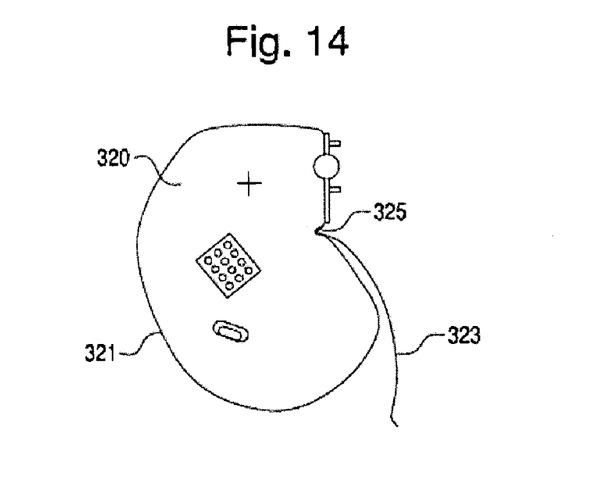
FIG. 14 is a side view of an airbag module with the center panel and extension panel of FIG. 13 shown in a deployed configuration.

Referring to FIGS. 13 and 14, a center panel 321 of a cushion 320 is shown according to an exemplary embodiment. Center panel 321 is coupled to an extension panel 323 that extends from the cushion 320 closing seam 325 at the rear side of the module to the forward side of the module. Extension panel 323 allows cushion 320 to be properly protected from sharp edges, flash and breaks at the dashboard lid during deployment. Extension panel 323 may be configured as a deployment control panel to direct the cushion deployment trajectory.

It is important to note that the construction and arrangement of the cushion wrap and/or deployment control flap with additional features as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature of number of discrete elements or positions may be altered or varied. Other substitutions, modifications, changes and omissions may be made in the design, operating conditions and arrangement of the exemplary embodiments.

What is claimed is:

1. An airbag module comprising:
   a retainer;
   an airbag cushion including at least one vent hole;
   a bag wrap wrapped around the airbag cushion, the bag wrap including a first end fixed to the retainer or airbag cushion, a second end fixed to the retainer or airbag cushion, and a slot between the first end and the second end;
   a deployment control flap to change trajectory of the airbag such that the airbag will deploy upwards and laterally to left and right sides, the deployment control flap including a first end fixed to the retainer or airbag cushion and a second end including a tongue that engages the slot; and
   an inflator to inflate the airbag cushion,
   wherein the bag wrap further includes a weakened tear area located between the first end and the slot.

2. The airbag module of claim 1, wherein the airbag cushion is a mid-mount airbag or a top-mount passenger airbag.

3. The airbag module of claim 1, wherein the at least one vent hole is located in a throat portion of the airbag cushion.

4. The airbag module of claim 3, wherein the at least one vent hole is exposed early during inflation such that if the airbag cushion contacts an obstruction, gas can escape from the airbag cushion to release pressure in the airbag cushion.

5. The airbag module of claim 1, wherein the deployment control flap unfolds in a direction of trajectory of the deploying airbag cushion.

6. The airbag module of claim 1, wherein the deployment control flap is attached at one end to retainer studs.

7. The airbag module of claim 6, wherein an opposite end of the deployment control flap includes a tear section.

8. The airbag module of claim 1, wherein the deployment control flap is an extension of a center panel.

9. The airbag module of claim 8, wherein the deployment control flap extends from an airbag closing seam at a rear side of the airbag module to a forward side of the airbag module.

10. The airbag module of claim 1, wherein the deployment control flap includes a folded portion.

11. The airbag module of claim 10, wherein the bag wrap overlies the folded portion.

* * * * *